US012087478B2

(12) United States Patent
Hammer et al.

(10) Patent No.: US 12,087,478 B2
(45) Date of Patent: Sep. 10, 2024

(54) RESISTOR ASSEMBLY FOR TAP CHANGER AND TAP CHANGER

(71) Applicant: Maschinenfabrik Reinhausen GmbH, Regensburg (DE)

(72) Inventors: Christian Hammer, Regensburg (DE); Andreas Sachsenhauser, Mallersdorf (DE); Alfred Bieringer, Geiselhoering (DE); Riccardo Dalla Vecchia, Montecchio Maggiore (IT)

(73) Assignee: MASCHINENFABRIK REINHAUSEN GMBH, Regensburg (DE)

( * ) Notice: Subject to any disclaimer, the term of this patent is extended or adjusted under 35 U.S.C. 154(b) by 226 days.

(21) Appl. No.: 17/640,839

(22) PCT Filed: Sep. 8, 2020

(86) PCT No.: PCT/EP2020/074987
§ 371 (c)(1),
(2) Date: Mar. 7, 2022

(87) PCT Pub. No.: WO2021/058272
PCT Pub. Date: Apr. 1, 2021

(65) Prior Publication Data

US 2022/0344079 A1 Oct. 27, 2022

(30) Foreign Application Priority Data

Sep. 27, 2019 (DE) ..................... 10 2019 126 168.6

(51) Int. Cl.
*H01C 13/02* (2006.01)
*H01C 1/01* (2006.01)
*H01F 29/02* (2006.01)

(52) U.S. Cl.
CPC ............... *H01C 13/02* (2013.01); *H01C 1/01* (2013.01); *H01F 29/02* (2013.01)

(58) Field of Classification Search
CPC ............ H01C 13/02; H01C 1/01; H01F 29/02
See application file for complete search history.

(56) References Cited

U.S. PATENT DOCUMENTS 3,207,504 A * 9/1965 Kelley .................. H01C 17/02 269/254 R
4,935,717 A 6/1990 Osawa et al.
(Continued)

FOREIGN PATENT DOCUMENTS

DE 7707461 U1 7/1977
DE 4231353 A1 4/1993
(Continued)

OTHER PUBLICATIONS

DE-202012100521 translation (Year: 2012).*
WO-2012126685 translation (Year: 2012).*

*Primary Examiner* — Kyung S Lee
(74) *Attorney, Agent, or Firm* — LEYDIG, VOIT & MAYER, LTD.

(57) ABSTRACT

A resistor assembly can be used in a tap changer. The resistor assembly may include: a resistor element, which is held by at least two resistor holders; a base plate with at least one opening and on which the at least two resistor holders holding the resistor element are arranged; a plurality of guides, respectively formed in each of the resistor holders and being configured to position a first end and a second end of the resistor element with respect to a longitudinal direction between the two resistor holders; and contact points of the resistor element, the contact points being electrically contacted by contacts of the tap changer in a condition where the resistor element is inserted into the resistor holder.

12 Claims, 5 Drawing Sheets

(56) References Cited

U.S. PATENT DOCUMENTS

| | | | | |
|---|---|---|---|---|
| 5,744,713 | A * | 4/1998 | Wienand | G01P 5/12 73/756 |
| 2010/0090794 | A1 | 4/2010 | Nilsson et al. | |
| 2016/0329168 | A1 * | 11/2016 | Kaltenborn | H01F 29/02 |

FOREIGN PATENT DOCUMENTS

| | | | | |
|---|---|---|---|---|
| DE | 202012100521 | * | 6/2012 | H01C 1/01 |
| DE | 102011014325 | A1 | 9/2012 | |
| EP | 0554914 | A2 | 8/1993 | |
| WO | WO-2012126685 | * | 9/2012 | H01H 9/0016 |

* cited by examiner

RESISTOR ASSEMBLY FOR TAP CHANGER AND TAP CHANGER

CROSS REFERENCE TO RELATED APPLICATIONS

This application is a U.S. National Phase application under 35 U.S.C. § 371 of International Application No. PCT/EP2020/074987, filed on Sep. 8, 2020 and claims benefit to German Patent Application No. DE 10 2019 126 168.6, filed on Sep. 27, 2019. The International Application was published in German on Apr. 1, 2021 as WO 2021/058272 A1 under PCT Article 21(2).

FIELD

The invention relates to a resistor assembly for a tap changer and to a tap changer having such a resistor assembly.

BACKGROUND

German patent application DE 42 31 353 A1 discloses a tap changer. A current-limiting resistor is connected to one of the tap selectors at one end and to the neutral point at its other end. The resistor is installed in a fixed and unchangeable manner.

German utility model DE 77 07 461 U discloses a diverter switch resistor. The diverter switch resistor consists of round, oval, rectangular or square resistor material with rounded edges, which resistor material is bent into resistor spirals and installed in chambers in a self-supporting manner. The bent resistor spiral is installed in a chamber formed from two insulating material bars.

Tap changers, in particular on-load tap changers, are used for uninterrupted switching between winding taps of a transformer. In on-load tap changers that are based on the high-speed resistor switching principle, the circulating current that flows during the intermediately simultaneous contacting of the currently connected tap contact and the preselected new tap contact in the event of switching is limited by ohmic resistors, and thereby, ensures an uninterrupted change in the transmission ratio of the transformer. The ohmic resistor has to be designed depending on the specific circuit topology, the individual operating conditions as well as the load current and the step voltage, that is to say in particular in accordance with the respective application of the on-load tap changer. Here, the voltage that is present between the currently connected tap contact and the preselected tap contact of the on-load tap changer is referred to as the step voltage. The resistor design is complicated and affects the entire manufacturing process, in particular the assembly process of the tap changer. This is because a different number and dimensioning of the resistors is required depending on the application, and therefore the structural design of the tap changer also has to be adapted under certain circumstances. This results in a large number of different variants of tap changers depending on their respective application. At present, the tap changer is fitted with the required transition resistors during assembly according to the resistance value determined for the specific order and then fully assembled. In view of the high number of variants, this leads to increased effort when assembling the tap changer.

SUMMARY

In an embodiment, the present disclosure provides a resistor assembly that can be used in a tap changer. The resistor assembly may include: a resistor element, which is held by at least two resistor holders; a base plate with at least one opening and on which the at least two resistor holders holding the resistor element are arranged; a plurality of guides, respectively formed in each of the resistor holders and being configured to position a first end and a second end of the resistor element with respect to a longitudinal direction between the two resistor holders; and contact points of the resistor element, the contact points being electrically contacted by contacts of the tap changer in a condition where the resistor element is inserted into the resistor holder.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
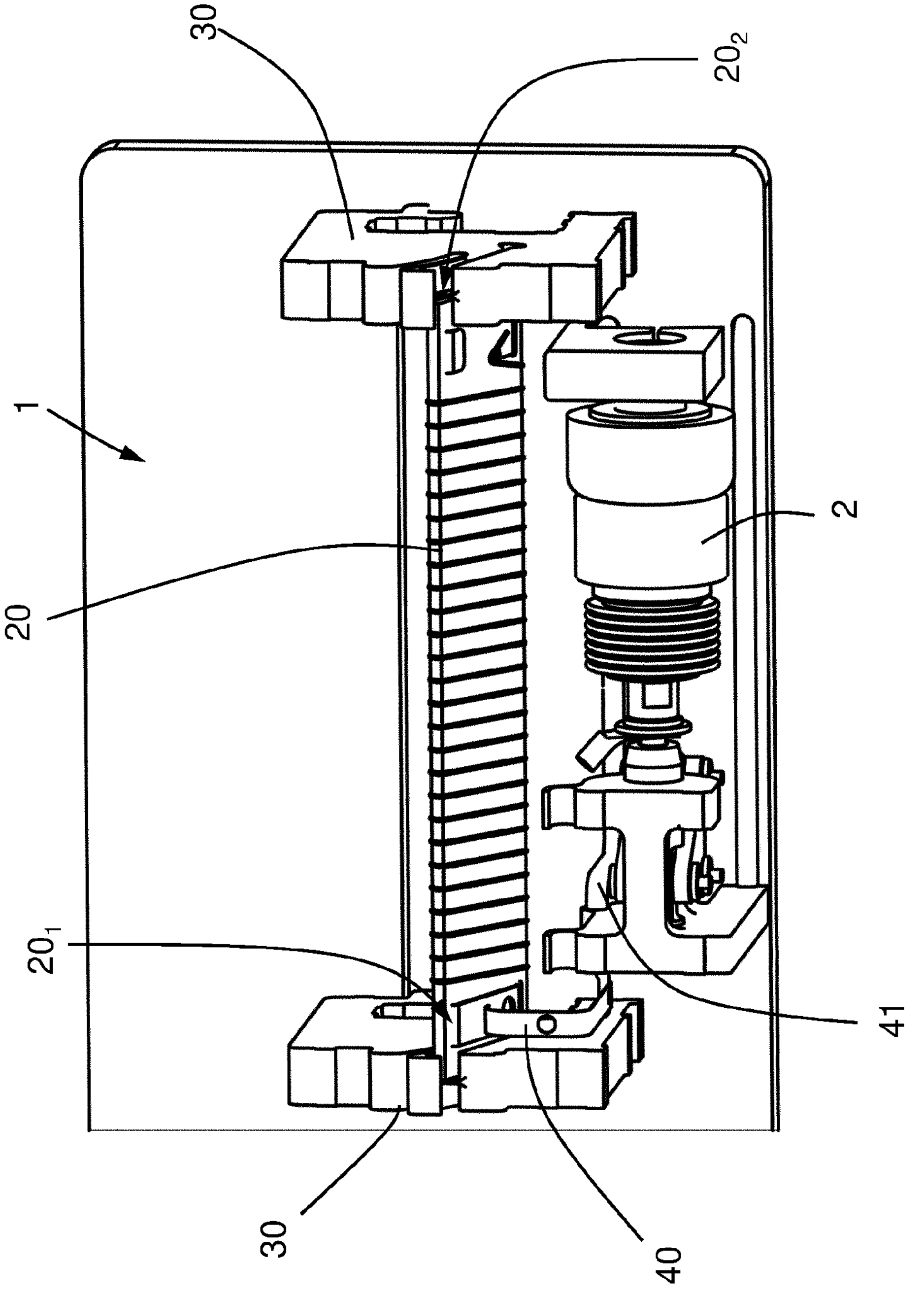
FIG. 1 shows a partial view of a tap changer with the arrangement of a resistor element.

Aspects of the present disclosure provide an improved concept for a resistor assembly for a tap changer, which resistor assembly can be easily and quickly adapted to different applications of the tap changer and in so doing ensures the operational reliability of the tap changer.

A resistor assembly, according to an embodiment of the invention, for a tap changer comprises at least one resistor element, which is held by at least two resistor holders. The resistor holders are provided at least on a base plate with at least one opening, on which base plate the at least two resistor holders for receiving the resistor element are arranged. The resistor element can be inserted into the resistor holder guide provided in the resistor holder through the opening. Guides are formed in each resistor holder. Each guide of the two resistor elements positions a first end and a second end of the resistor element with respect to a longitudinal direction between the two resistor holders. In each case one contact point of the resistor element is electrically contacted by contacts of the tap changer when a resistor element is inserted into the resistor holder.

The improved concept for the tap changer having a resistor assembly has the advantage that it becomes possible to change or to replace the resistors easily and quickly when needs change (such as, for example, when there is a change in the operating conditions of the tap changer) and still ensure the operational reliability of the tap changer in so doing.

According to one possible embodiment of the resistor assembly for a tap changer, the, in each case, one contact point of the resistor element is provided in an edge region at the first end and at the second end of each resistor element.

According to one possible embodiment of the resistor assembly for a tap changer, each resistor holder comprises a guide for fixing the resistor element. Each guide can be formed as a slot with a closed end and an open end. The slot is provided, at least in part, with a side wall, which can extend partially along the slot. The resistor element can be pushed in via the open end of the slot. In this case, the resistor assembly is formed in such a way that, after the tap changer has been assembled, the resistor element is fixed between the at least two resistor holders by means of the guide of the resistor holders.

According to one possible further embodiment, the guide can comprise a holding element, which can be in the form of a reversibly and elastically pivotable leg with a snap-action hook provided at a free end. The snap-action hook secures the resistor element pushed into the guide and holds it in position between the two resistor holders. The elastically pivotable leg gives way when the resistor element is pushed into the guide and in so doing likewise forms a part of the guide.

According to one possible embodiment of the invention, the at least one resistor element comprises a resistor carrier and a current-limiting element.

According to one possible embodiment of the invention, the resistor carrier can be in the form of a plate and the current-limiting element can be in the form of a metal wire which is wound around the plate. According to one possible embodiment, the resistor carrier can be in the form of a frame and the current-limiting element can be in the form of one or more metal springs which are clamped into the frame.

According to one possible embodiment of the invention, each resistor element can have a respective edge region at the first end and at the second end, which edge region is free of the current-limiting element. The closed end of the guide defines an end position for the resistor element in the resistor holder. As a result, in each case a part of the edge region of the resistor element substantially interacts in a positively locking manner with the slot of the guide.

The interaction in a positively locking manner essentially means that the edge regions of the resistor element are surrounded at least partially in a positively locking manner, that is to say with a precise fit, by the guide at least on three sides. The open end of the guide thus forms an open side of the guide, via which open side the resistor element can be pushed into the resistor holder. When the at least one resistor element is pushed into the guide, the elastically pivotable leg gives way and the at least one resistor element, when it has reached the end position in the guide, is locked in said guide.

According to at least one possible embodiment, the snap-action hook forms a part of the guide of the resistor holder in such a way that the snap-action hook surrounds the resistor element at least in part when it has reached the end position in the guide and thereby locks it in the end position. The snap-action hook can also be easily released from the locking position, so that the resistor element can be removed again and, for example, replaced by another one (with a different specification).

According to at least one possible embodiment, the resistor holder and the guide are formed in one piece and from insulating material. According to at least one embodiment, the resistor holder, the guide and the holding element are formed in one piece. The resistor holder can preferably be manufactured from a plastic using an injection-molding process.

According to at least one possible embodiment, the base plate has at least one opening in the region of the at least two resistor holders, which opening is formed in such a way that the at least one resistor element can be fixed between the at least two resistor holders by means of the guides of the resistor holders through the opening.

This allows the resistor elements (resistors) to be inserted after the tap changer has been assembled and allows the tap changer to be easily adapted to different applications by replacing the resistor elements. In this way, the electrical contacting of the resistor elements is also ensured.

According to one possible embodiment, the at least one opening can be substantially rectangular.

According to one possible embodiment of the invention, the resistor element can comprise two contact points composed of electrically conductive material, which are electrically conductively connected to the current-limiting element. The contact points of the resistor element are provided substantially in an edge region at the first end and at the second end of each resistor element.

According to one possible embodiment, each contact point is in the form of a metal plate.

According to one possible embodiment, the resistor assembly comprises at least two contacts which can connect the resistor element to current-carrying lines of the tap changer via the at least one contact point. The contacts can be in the form of spring contacts. The resistor element is preferably electrically conductively connected to the take-off lead and/or contacts and/or switches and/or other current-carrying components of the tap changer via the current-carrying lines. The contacts can be, for example, selector contacts and corresponding tap contacts via which the voltage ratio of the transformer windings is preselected or set. The switches can be in the form of, for example, vacuum interrupters and/or other mechanical switching elements via which the diverter switch operation from the currently connected tap contact to the preselected tap contact is performed. According to at least one embodiment, the contacts are in the form of spring contacts which are formed with a defined mechanical preload in such a way that the spring contacts press against the contact points of the resistor carrier when the resistor element is positioned in the resistor holders.

According to one possible further embodiment, the contacts can be integrated into the resistor holder. The contacts would also make up a part of the guide, for example.

According to one possible further embodiment of the invention, the at least two resistor elements can be arranged substantially parallel to one another and/or one above the other in the vertical direction between the resistor holders.

According to one possible embodiment of the invention, the at least two resistor elements form a resistor module.

According to the improved concept, a tap changer which comprises the resistor assembly according to the invention is also specified.

According to one possible embodiment of the invention, the tap changer comprises at least the first base plate and a second base plate, which are held in a spatial relationship to one another via at least two resistor holders.

According to one possible embodiment of the invention, the at least two resistor holders can be arranged perpendicularly to the at least two base plates.

According to one possible embodiment of the invention, the at least two resistor holders can be arranged between the at least two base plates.

According to one possible embodiment of the invention, the two resistor holders can be arranged parallel to one another.

In the following, the invention is explained in detail on the basis of exemplary embodiments with reference to the drawings. Components which are identical or functionally identical or which have an identical effect may be provided with identical reference signs. Identical components or components having an identical function may in some cases be explained only in relation to the figure in which they first appear. The explanation is not necessarily repeated in the subsequent figures.

Identical reference signs are used for elements of embodiments of the invention that are identical or functionally identical. Furthermore, for the sake of clarity, each of the individual figures contains only those reference signs necessary for the description of said figure. Components of the tap changer that are irrelevant to the following description of the resistor assembly have not been shown in these figures for the sake of clarity. The figures merely illustrate exemplary embodiments of the invention without, however, limiting the invention to the illustrated exemplary embodiments.

FIG. 1 shows a partial view of a tap changer 1. The tap changer 1 comprises at least one switching element 2 which is used to switch from one tap to the next tap of a transformer winding. A resistor element 20 is assigned to the switching element 2, which resistor element is used to limit the circulating current that flows during the intermediately simultaneous contacting of a currently connected tap contact and the preselected new tap contact in the event of switching over. This ensures an uninterrupted change in the transmission ratio of the transformer. The resistor element 20 is held in two resistor holders 30 and is thus positioned in relation to the switching element 2. The resistor element 20 defines a first end $\mathbf{20}_1$ and a second end $\mathbf{20}_2$ by way of which it is held in the two resistor holders 30. An electrically conductive connection from the switching element 2 to the resistor element 20 in the region of the first end $\mathbf{20}_1$ and the second end $\mathbf{20}_2$ is established via electrical contacts 40.

Figure 2:
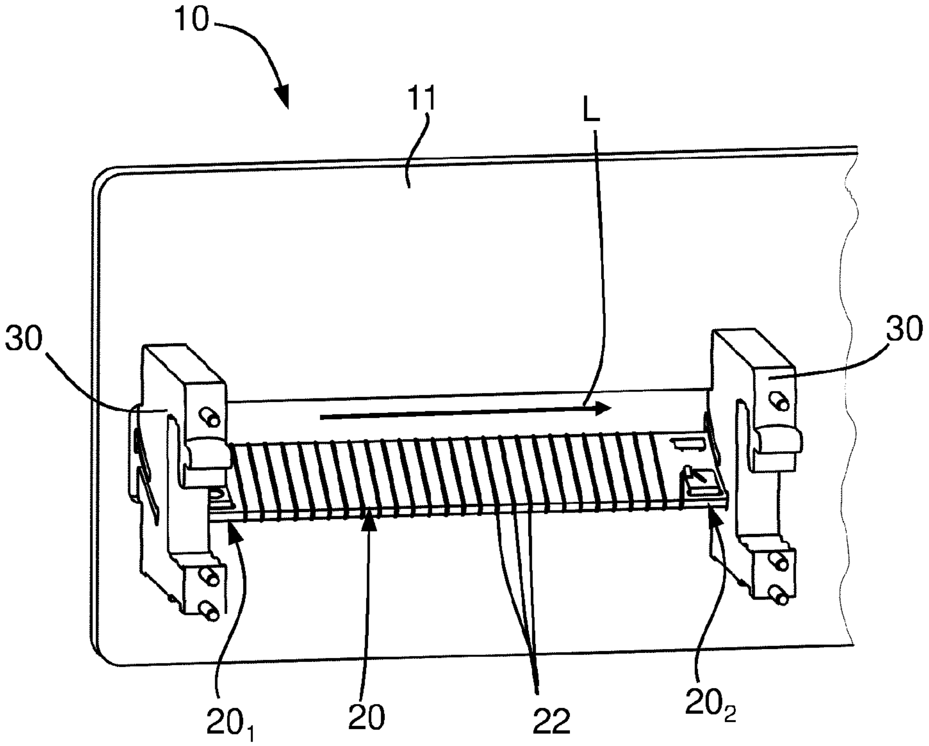
FIG. 2 shows a perspective representation of an exemplary embodiment of a resistor assembly according to the improved concept.

FIG. 2 shows a perspective representation of an exemplary embodiment of a resistor assembly 10 for a tap changer 1. The resistor assembly 10 comprises two resistor holders 30 which are arranged or mounted on a base plate 11. A resistor element 20 is held and fixed at a first end $\mathbf{20}_1$ and at a second end $\mathbf{20}_2$ by the resistor holders 30. The resistor element 20 is positioned in the longitudinal direction L by the resistor holders 30.

Figure 3:
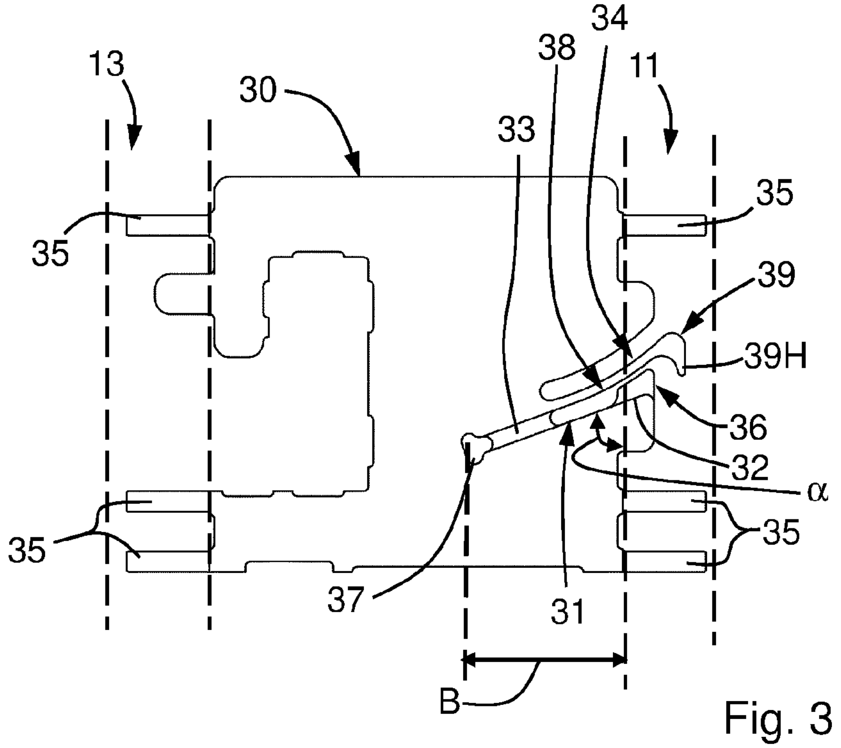
FIG. 3 shows a longitudinal sectional representation of an exemplary embodiment of a resistor holder for a resistor assembly according to the improved concept.

Each resistor holder 30 has, as shown in FIG. 3, a guide 31 which makes it easier to insert the resistor element 20 and positions the inserted resistor element 20 in its longitudinal direction L between the two resistor holders 30. The guide 31 serves as a holder for the first end $\mathbf{20}_1$ and the second end $\mathbf{20}_2$ of the resistor element 20. According to this exemplary embodiment, the guide 31 consists of a slot 32 formed in the resistor holders 30. The slot 32 is provided, at least in part, with a side wall 33 which extends only partially along the entire length of the slot 32. The two side walls 33 represent a side boundary for the resistor element 20, which side boundary makes it easier to push the resistor element 20 into the guide 31 of the two resistor holders 30 and prevents the resistor element 20 from being able to be displaced in the longitudinal direction L of the resistor element 20 when it is being pushed in or in the end position. The guide 31 further has a closed end 37 and an open end 36. The guide 31 is formed in the resistor element 20 in such a way that the closed end 37 is located in the resistor holder 30 and is arranged at a distance B from the base plate 11. Further, the guide 31 is inclined at an angle $\alpha$ in relation to the base plate 11 when the resistor holders 30 are mounted on the base plate 11. The open end 36 of the guide 31 of the resistor holder 30 is provided opposite one of the openings 12 in the base plate 11 when the resistor holder 30 is mounted on the base plate 11. Furthermore, the resistor holder 30 comprises a holding element 34 for the resistor element 20 when this resistor element is inserted in the guides 31 of the resistor holders 30. The holding element 34 is in the form of a reversibly and elastically pivotable leg 38 which has a snap-action hook 39H formed at a free end 39. The pivotable leg 38 of the holding element 34 also forms a part of the guide 31. When the resistor element 20 is inserted into the resistor holders 30, the elastically formed holding element 34 moves back, so that the resistor element 20 can be pushed into the guide 31. The one end position of the resistor element 20 in the guide 31 is reached when this resistor element comes to rest against the closed end 37 of the guide 31. When the resistor element 20 has reached the end position in the guide 31, the pivotable leg 38 moves to the starting position and the elastic snap-action hook 39H at the free end 39 returns to its starting position and thus locks the resistor element 20 in the guide 31. The resistor element 20 is then substantially operatively connected to the guide 31 in the region of the first end $\mathbf{20}_1$ and the second end $\mathbf{20}_2$ and the snap-action hook 39H and thus fixed in the two resistor holders 30.

Figure 4:
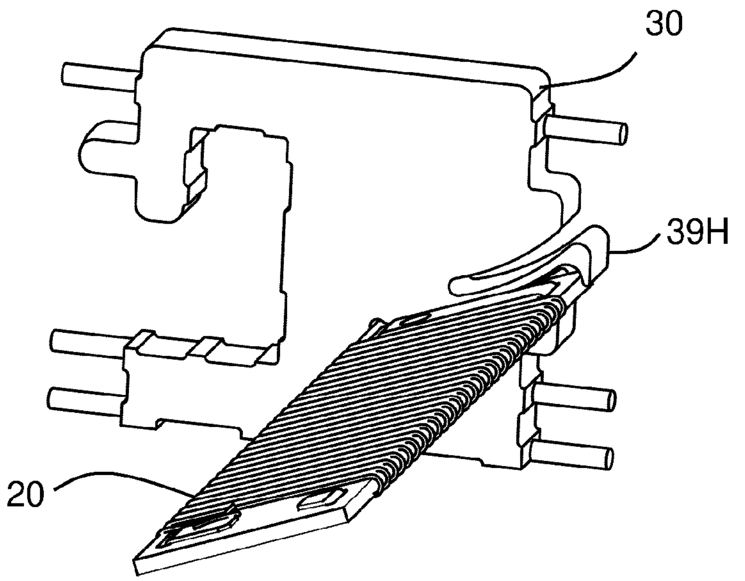
FIG. 4 shows a view of a detail of the resistor assembly from FIG. 2.

FIG. 4 shows a view of a detail of the resistor assembly having a resistor element 20 which is held by one of the resistor holders 30. As already mentioned in the description of FIG. 3, the resistor element 20 is seated in the guide 31 of the resistor holder by way of the first end $\mathbf{20}_1$ or the second end $\mathbf{20}_2$. The elastic snap-action hook 39H at the free end 39 of the pivotable leg secures the resistor element 20 in the guide 31.

Figure 5:
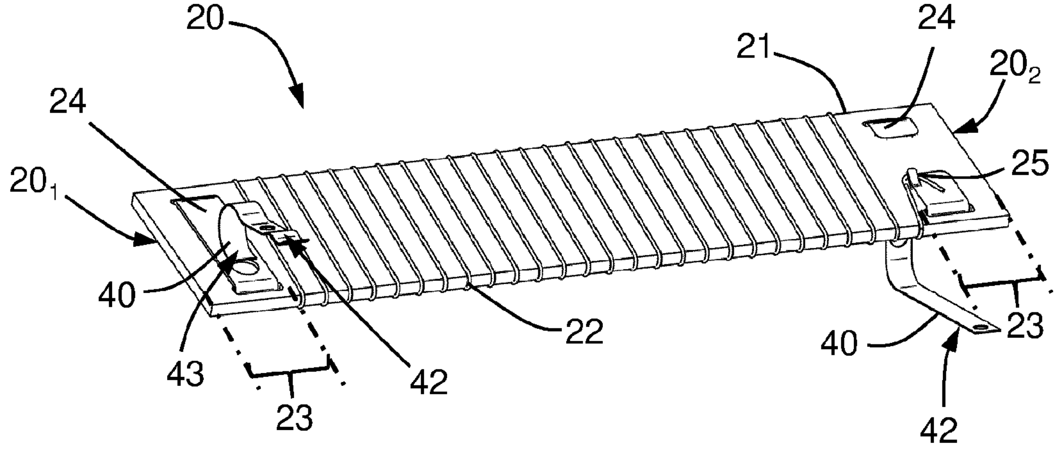
FIG. 5 shows a perspective representation of an exemplary embodiment of a resistor element according to the improved concept.

FIG. 5 shows a perspective representation of an exemplary embodiment of a resistor element 20. The resistor element 20 consists of a resistor carrier 21 and a current-limiting element 22 which, according to this exemplary embodiment, is in the form of a metal wire which is wound around the resistor carrier 21 and fixed to the first end $\mathbf{20}_1$ or the second end $\mathbf{20}_2$ by means of a clip 25. Furthermore, the resistor element 20 has a respective edge region 23 at the first end $\mathbf{20}_1$ and at the second end $\mathbf{20}_2$, which edge region is not in contact with the current-limiting element 22, the metal wire. Each of the edge regions 23 of the resistor carrier 21 has a respective contact point 24. The contact points 24 are formed from electrically conductive material and are in the form of, for example, clips or small plates. Likewise illustrated in FIG. 5 and shown assembled in FIGS. 6 and 7 are spring contacts 40 which are connected to current-carrying lines 41 of the tap changer 1 at a respectively first free end 42 and which are pressed against the contact points 24 of the resistor element 20 with a defined spring force at the respectively second free end 43.

Figure 6:
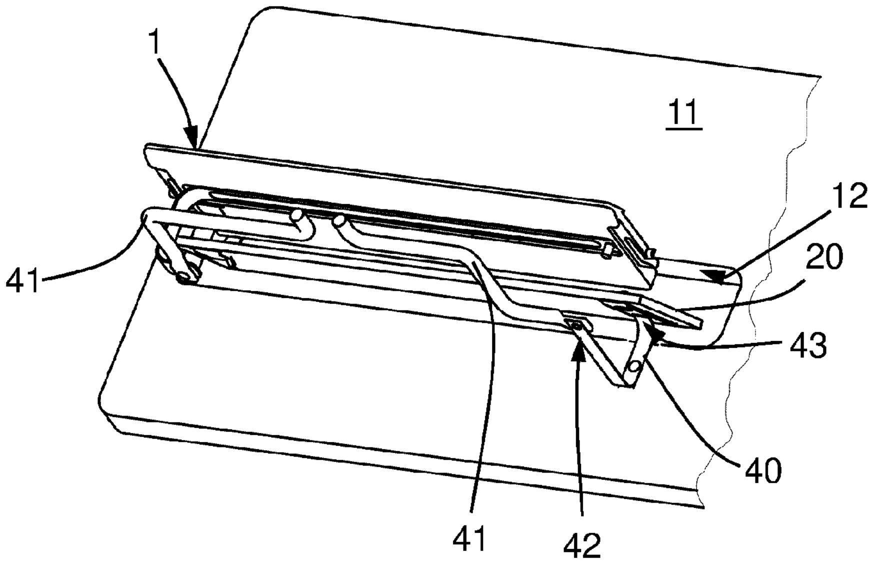
FIG. 6 shows a perspective representation of the arrangement of the resistor element from FIG. 2 in electrical contact with lines of the tap changer.
Figure 7:
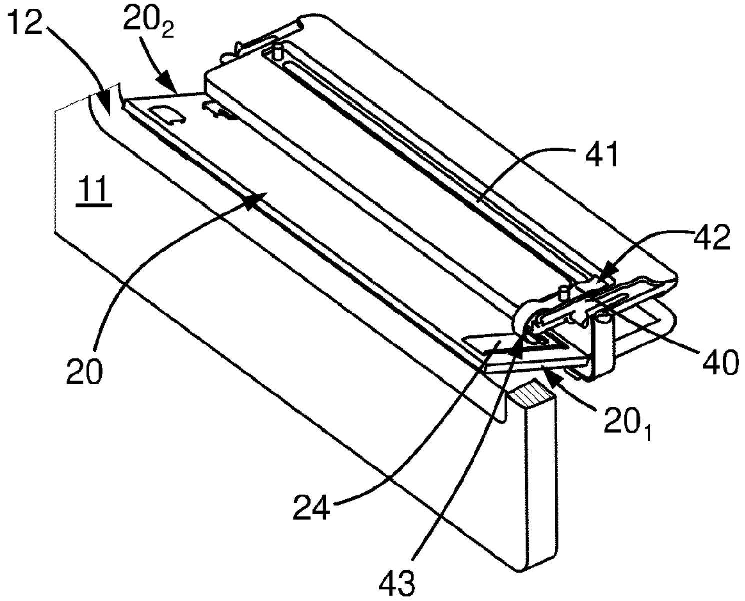
FIG. 7 shows another view of the perspective representation of the arrangement of the resistor element from FIG. 6.

FIGS. 6 and 7 show, from different perspective views, the contacting of the resistor element 20 with the current-carrying lines 41 of the tap changer 1. The current-carrying lines 41 of the tap changer 1 are connected to the respectively first free end 42 of the spring contacts 40. In order to establish the electrical contact, the spring contacts 40 press against the contact points 24 formed when the resistor element 20 is inserted through the opening 12 in the base plate 11.

Figure 8:
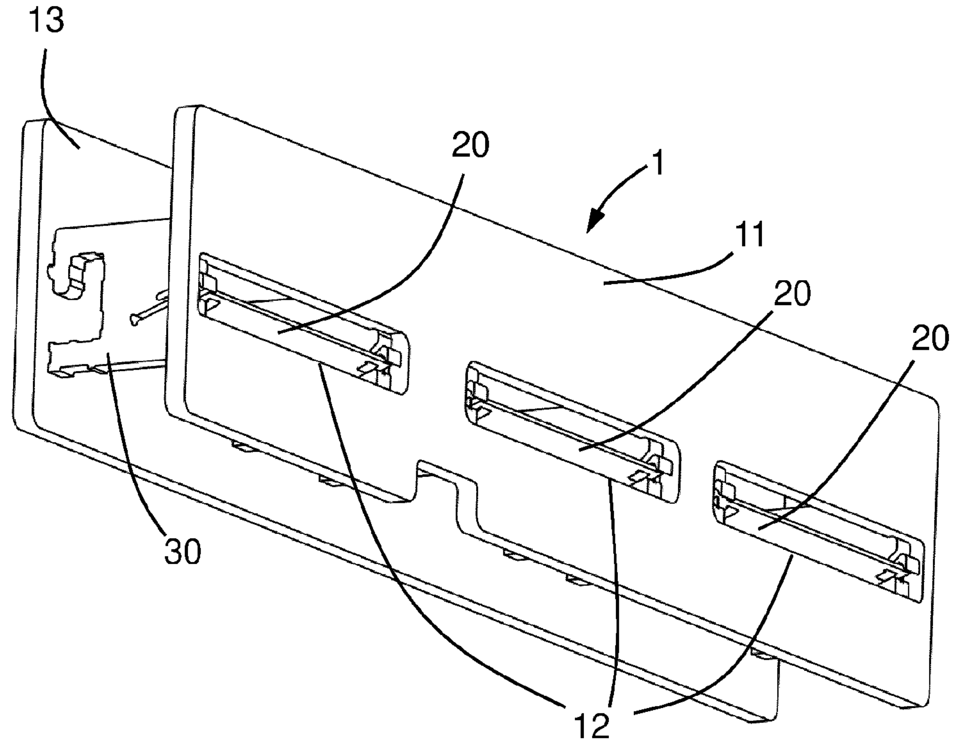
FIG. 8 shows a perspective representation of a further exemplary embodiment of a resistor assembly according to the improved concept.
Figure 9:
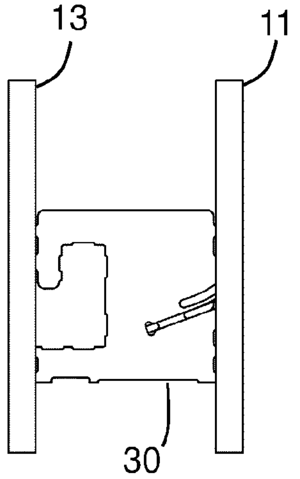
FIG. 9 shows a side view in longitudinal section of the resistor assembly from FIG. 8.

FIG. 8 shows a perspective representation of a further embodiment of a resistor assembly according to the improved concept. FIG. 9 is a longitudinal sectional side view of the resistor assembly from FIG. 8. FIGS. 8 and 9 show the resistor assembly in a three-phase tap changer 1. A base plate 11 composed of insulating material thus has three openings 12 through which the resistor elements 20 can be inserted into the fully assembled tap changer 1. A second base plate 13 composed of insulating material is arranged opposite the base plate 11. A total of six resistor holders 30 are fitted between the two base plates 11 and 13. A resistor element 20 is fixed between two resistor holders 30 in each case. The two base plates 11 and 13 are connected to one another via the resistor holders 30. For this purpose, the resistor holders 30 preferably have pins 35 which can be inserted and riveted into corresponding holes provided in the base plates 11 and 13.

Figure 10:
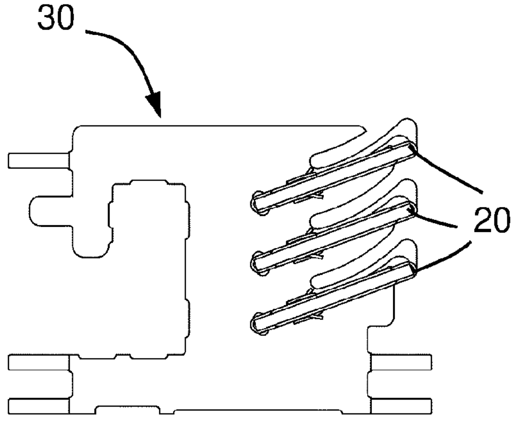
FIG. 10 shows a longitudinal sectional representation of an exemplary embodiment of a plurality of resistor elements fixed in a resistor holder according to the improved concept.

FIG. 10 shows a longitudinal sectional representation of an exemplary embodiment of a plurality of resistor elements 20 fixed in a resistor holder 30 according to the improved concept. Here, a total of three resistor elements 20 are arranged, by way of example, on the resistor holder 30 in a stacked manner one below the other or one above the other. For this purpose, the resistor holder 30 has in each case three guides 31 and three snap-action hooks 34, which are of identical design.

Using a resistor assembly 10 or a tap changer 1 according to the improved concept, it is possible to equip the tap changer 1 in a flexible manner, that is to say with the required resistor elements 20 with regard to the size of the resistor (ohmic resistor) depending on the application. According to the improved concept, the resistor elements 20 can also be used after the assembly of the complete tap changer 1 and, if necessary, for example when the operating conditions of the tap changer 1 change, can also be easily replaced. As a result, the tap changer 1 can be built independently of the order and as a stock item. For example, the adaptation to the respective application of the tap changer 1 could also be completely outsourced from the manufacturing process, and the resistors could be installed into the tap changer only on site by the transformer manufacturer or the grid operator.

It is assumed that the present disclosure and many of the attendant advantages thereof can be understood from the above description. Further, it is evident that various changes can be made to the shape, construction and arrangement of the components without departing from the disclosed subject matter or without sacrificing all material advantages. The embodiment described is merely explanatory and such changes are intended to be covered by the following claims. Furthermore, it is understood that the invention is defined by the following claims.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS

1 Tap changer
2 Switching element
10 Resistor assembly
11 Base plate
12 Opening
13 Base plate
20 Resistor element
$\mathbf{20_1}$ First end
$\mathbf{20_2}$ Second end
21 Resistor carrier
22 Current-limiting element
23 Edge region
24 Contact points
25 Clip
30 Resistor holder
31 Guide
32 Slot
33 Side wall
34 Holding element
35 Pins
36 Open end
37 Closed end
38 Pivotable leg
39 Free end
39H Snap-action hook
40 Contact
41 Lines
42 First free end
43 Second free end
B Distance
L Longitudinal direction of the resistor element
α Angle

The invention claimed is:

1. A resistor assembly for a tap changer, the resistor assembly comprising:

a resistor element, which is held by at least two resistor holders;

a base plate with at least one opening and on which the at least two resistor holders holding the resistor element are arranged;

a plurality of guides, respectively formed in each of the resistor holders and being configured to position a first end and a second end of the resistor element with respect to a longitudinal direction between the two resistor holders; and contact points of the resistor element, the contact points being respectively electrically contacted by contacts of the tap changer in a condition where the resistor element is inserted into the resistor holder, wherein each of the guides is formed as a slot with a closed end and an open end, and the slot is provided, at least in part, with a side wall which extends partially along the slot, wherein the resistor element is configured to be pushed in via the open end, wherein each of the guides comprises a holding element which is in the form of a reversibly and elastically pivotable leg with a snap-action hook provided at a free end, and wherein the snap-action hook secures the resistor element pushed into the guide and holds it in position.

2. The resistor assembly as claimed in claim 1, wherein the contact points of the resistor element are provided in an edge region at the first end and at the second end of the resistor element.

3. The resistor assembly as claimed in claim 1, wherein the elastically pivotable leg is configured to give way in a condition where the resistor element is pushed into the guide.

4. The resistor assembly as claimed in claim 1, wherein the at least one resistor element comprises a resistor carrier which carries a current-limiting element.

5. The resistor assembly as claimed in claim 1, wherein:

the resistor element has a respective edge region at the first end and at the second end, the edge region being free of a current-limiting element; and the closed end of each of the guides defines an end position for the resistor element in the resistor holder in such a way that a part of the edge region of the resistor element substantially interacts in a positively locking manner with the slot of the respective one of the guides.

6. The resistor assembly as claimed in claim 1, wherein the resistor holder and the guide are formed in one piece.

7. The resistor assembly as claimed in claim 1, wherein the contact points of the resistor element consists of electrically conductive material and are electrically conductively connected to a current-limiting element of the resistor element.

8. The resistor assembly as claimed in claim 1, wherein the contacts are in a form of spring contacts, which are formed with a defined mechanical preload in such a way that the spring contacts are configured to press against the contact points of the resistor carrier in a condition where the resistor element is positioned in the resistor holders.

9. A tap changer comprising the resistor assembly as claimed in claim 1.

10. The tap changer as claimed in claim 9, wherein the tap changer comprises the first base plate and a second base plate, between which the at least two resistor holders are held and positioned relative to one another.

11. The resistor assembly as claimed in claim 1, the resistor assembly comprising a plurality of resistor elements respectively comprising a plurality of contract points, the resistor elements comprising the resistor element comprising the respective contact points, wherein each of the respective contact points of each of the respective one of the resistor elements is electrically contacted by the contacts of the tap changer in the condition where the respective one of the resistor elements is inserted in the respective resistor holder.

12. A resistor assembly for a tap changer, the resistor assembly comprising:

a resistor element, which is held by at least two resistor holders;

a base plate with at least one opening and on which the at least two resistor holders holding the resistor element are arranged;

a plurality of guides, respectively formed in each of the resistor holders and being configured to position a first end and a second end of the resistor element with respect to a longitudinal direction between the two resistor holders; and contact points of the resistor element, the contact points being respectively electrically contacted by contacts of the tap changer in a condition where the resistor element is inserted into the resistor holder, wherein the contacts are in a form of spring contacts, which are formed with a defined mechanical preload in such a way that the spring contacts are configured to press against the contact points of the resistor carrier in a condition where the resistor element is positioned in the resistor holders.

* * * * *